United States Patent [19]
Chen et al.

[11] Patent Number: 5,734,345
[45] Date of Patent: Mar. 31, 1998

[54] ANTENNA SYSTEM FOR CONTROLLING AND REDIRECTING COMMUNICATIONS BEAMS

[75] Inventors: Chun-Hong Harry Chen; Antony Y. Ho, both of Torrance; Martin Melnick, Rancho Palos Verdes, all of Calif.

[73] Assignee: TRW Inc., Redondo Beach, Calif.

[21] Appl. No.: 636,366

[22] Filed: Apr. 23, 1996

[51] Int. Cl.$^6$ ........................................... G01S 7/28
[52] U.S. Cl. ..................... 342/74; 342/81; 342/367; 342/373
[58] Field of Search ................... 342/74, 75, 78, 342/81, 367, 373, 374, 371

[56] References Cited

U.S. PATENT DOCUMENTS

| | | | |
|---|---|---|---|
| 3,731,316 | 5/1973 | Sheleg | 342/373 |
| 4,335,388 | 6/1982 | Scott et al. | 342/379 |
| 4,752,925 | 6/1988 | Thompson et al. | 370/307 |
| 4,792,813 | 12/1988 | Rosen | 343/781 P |
| 4,868,886 | 9/1989 | Assal et al. | 455/13.3 |
| 4,901,084 | 2/1990 | Huguenin et al. | 342/179 |
| 4,901,085 | 2/1990 | Spring et al. | 342/373 |
| 4,907,004 | 3/1990 | Zacharatos et al. | 342/373 |
| 4,924,234 | 5/1990 | Thompson | 342/369 |
| 5,038,150 | 8/1991 | Bains | 342/373 |
| 5,081,464 | 1/1992 | Renshaw | 342/375 |
| 5,093,668 | 3/1992 | Sreenivas | 342/374 |
| 5,115,248 | 5/1992 | Roederer | 342/372 |
| 5,248,980 | 9/1993 | Raguenet | 342/354 |
| 5,433,726 | 7/1995 | Horstein et al. | 244/158 R |
| 5,539,415 | 7/1996 | Metzen et al. | 343/700 MS |
| 5,555,257 | 9/1996 | Dent | 370/319 |
| 5,576,721 | 11/1996 | Hwang et al. | 343/753 |

OTHER PUBLICATIONS

"Antenna Engineering Handbook", Chapters 34–36 by Richard Johnson, McGraw–Hill, Inc., 1993.

"A Comparison Among 1–, 3–, and 7–Horn Feed for a 37–Beam MBA", IEEE Transactions on Antennas and Propagation, vol. 2., No. 1, pp. 1–8, Jan. 1994.

*Primary Examiner*—John B. Sotomayor
*Attorney, Agent, or Firm*—Michael S. Yatsko

[57] ABSTRACT

An antenna system 10 for a communications satellite which transmits and receives communications from ground based devices. The system includes an antenna array 16 containing a plurality of feed elements 18 which cooperate to receive or transmit coverage beams arranged in a circular layout at a coverage area in a far-field region proximate the surface of the earth. The feed elements 18 are arranged in a non-circular layout within the antenna array 16. This system further includes a beam forming network 14 for mapping coverage beam signals onto feed signals which drive the antenna array 16. The beam forming network 14 includes a beam forming matrix 28 and a beam connecting network 30. The beam connecting network 30 separates each coverage beam signal into a plurality of component signals weighted to have differing amplitudes from one another. The component signals are delivered to the beam forming matrix 28 which in turn produces corresponding feed signals to drive the antenna array 16 in such a manner as to form feed beams which cooperate to define the coverage beams at the far-field region. The beam connecting network 30 weights the component signals unevenly in order to shift corresponding resultant coverage beams inward or outward until aligned within the coverage area in a circular layout along concentric circles.

20 Claims, 10 Drawing Sheets

ANTENNA SYSTEM FOR CONTROLLING AND REDIRECTING COMMUNICATIONS BEAMS

RELATED APPLICATIONS

A related application exists entitled "Beam Forming Network for Multiple Beam Feed Sharing Antenna System" which was filed on Apr. 9, 1996, and is commonly owned by the assignee of the present application. A related patent exists entitled "Medium-Earth-Altitude Satellite-Based Cellular Telecommunications System," U.S. Pat. No. 5,433,726, issued Jul. 18, 1995. The disclosures of the above-noted patent and application are incorporated herein by reference in their entirety.

FIELD OF THE INVENTION

The present invention generally relates to communications satellites and, more specifically, to a system for controlling a radiating array to redirect communications beams to produce a desired resultant beam pattern.

BACKGROUND OF THE INVENTION

In general, satellites communicate with remote devices via radio frequency (RF) signals. The remote devices may include mobile and fixed cellular telephone stations and the like. The radio frequency (RF) signals are received by and transmitted from antennas mounted upon the satellites. Transmitters on board the satellite drive the antenna to generate outgoing RF signals in the form of beams directed in predetermined directions. Receivers on board the satellite accept incoming signals sensed by the antenna. Hereinafter, an RF signal processed shall be referred to as a "communications beam" or a "coverage beam".

In the past, several conventional antenna systems have been proposed, as discussed in Chapters 34–36 of the book entitled "Antenna Engineering Handbook, 3rd Edition", by Richard C. Johnson published by McGraw-Hill, Inc., 1993. This book is incorporated by reference.

Figure 1:
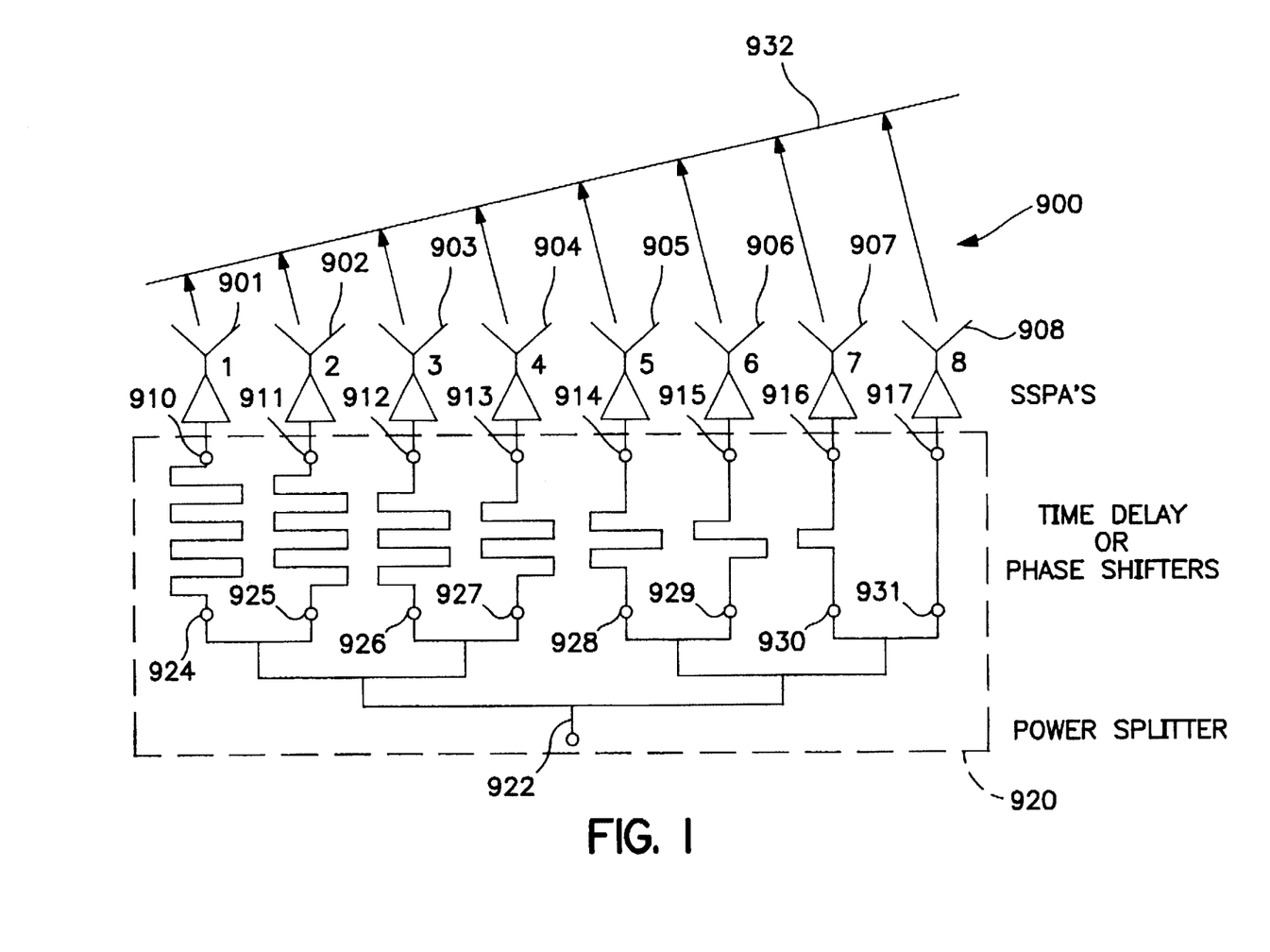
FIG. 1 generally illustrates a block diagram of a generic linear antenna arrangement for producing a single coverage beam from eight feed beams directed at an angle to the array axis.

These conventional antenna systems include direct radiating array antenna systems, such as shown in FIG. 1. FIG. 1 illustrates a generic one-dimensional direct radiating array (DRA) 900. The array 900 includes eight radiating elements or feed elements 901–908 connected to leads 910–917, respectively. The leads 910–917 may represent output feed ports of a beam forming network 920 generally designated in dashed lines. The beam forming network 920 receives an incoming signal on beam input port 922, divides and distributes components of this incoming signal among leads 910–917. These component signals drive feed elements 901–908 which produce element beams based thereon. The beam forming network (BFN) 920 includes phase controllers 924–931, associated with leads 910–917, which induce phase shifts or time delays into the signals passed therethrough. The phase controllers 924–931 cooperate to direct a resultant beam output from the radiating elements 901–907 in a desired direction.

For purposes of explanation, each feed element 901–907 is illustrated as outputting a dashed signal representative of an outgoing element beam. The phased controllers 924–931 induce phase shifts such that components of an input signal are output in a delayed manner to form a wave front 932. The resulting coverage beam formed from the components is emitted in a direction normal to the wave front 932.

Figure 2A:
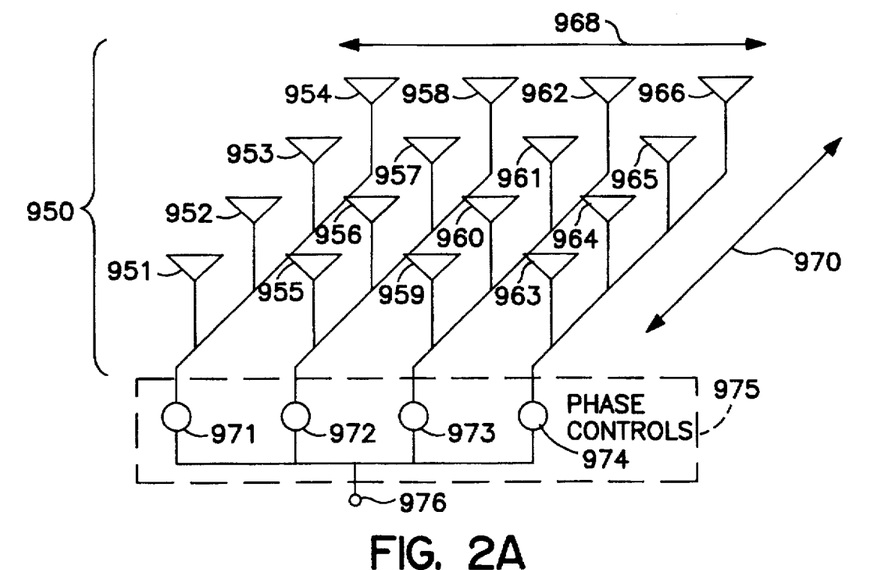
FIG. 2A illustrates a block diagram of a generic two-dimensional antenna array having feed elements arranged in a planer configuration with a phase shift introduced between feed beams in adjacent columns.

The example in FIG. 1 may be expanded to a two-dimensional array (see FIG. 2A), wherein a direct radiating array 950 comprises a plurality of radiating or feed elements 951–966 arranged in rows and columns along x-axis 968 and y-axis 970. In FIG. 2A, each column is connected to one of phase controllers 971–974. All columns are driven by a single beam port 976. The phase controllers 971–974 in the beam forming matrix 975 induce phase shifts of φ, 2φ, 3φ and 4φ, respectively. Hence, radiating elements 951–954 output the incoming signal with a φ-degree phase shift. Radiating elements 951–954 include no phase shifts therebetween and thus simultaneously output the signal. Similarly, radiating elements 955–958 output the incoming signal from beam port 976 with a 2φ-degree phase shift. Elements 959–962 introduce a 3φ-degree phase shift into the incoming signal, while elements 963–966 introduce a 4φ-degree phase shift. Consequently, the resulting beam is emitted at an angle to the x-axis 968 with respect to the plane formed by the radiating elements 951–966.

Phase controllers may also be introduced between the radiating elements within each column in order to redirect the resulting beam at an angle to the y-axis 970. Thus, by introducing desired phase shifts between each of the radiating elements, a resulting beam may be redirected with respect to x-axis 968 and y-axis 970.

Figure 2B:
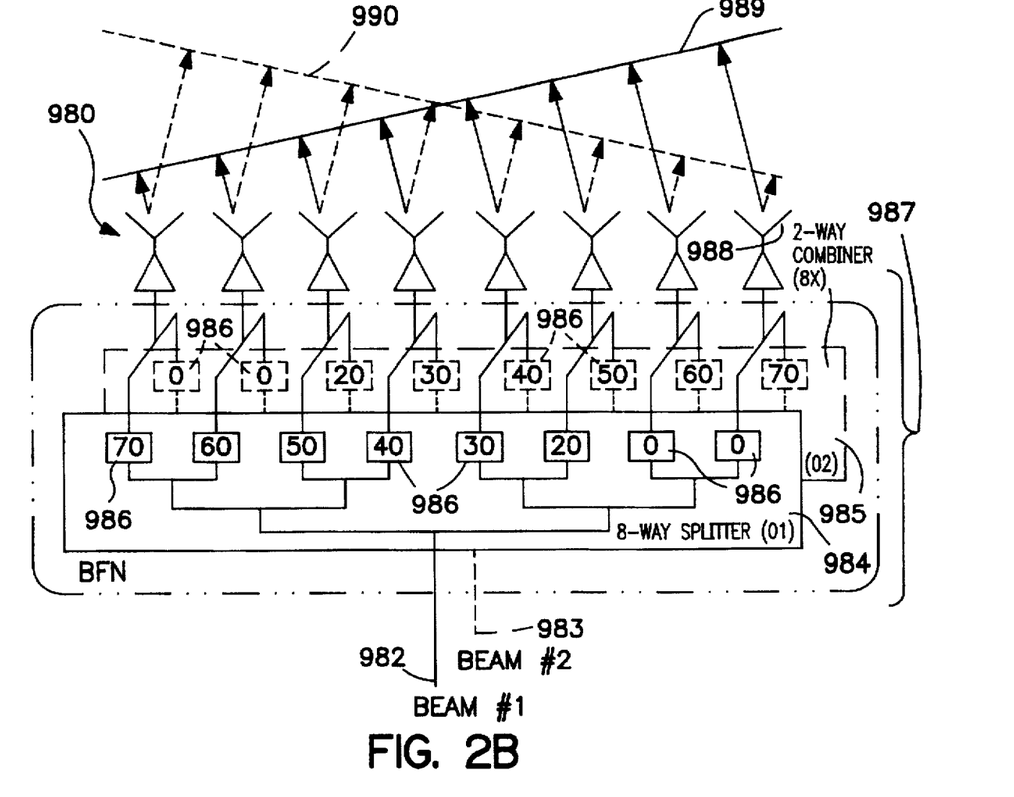
FIG. 2B illustrates a block diagram of an antenna array and beam forming network having multiple input ports, attached to multiple phase shifters.

FIG. 2B illustrates an antenna array 980 having a plurality of input beam signals applied at beam input ports 982 and 983. The input ports 982 and 983 drive separate beam forming networks 984 and 985. The two single beam BFNs 984 and 985 form a 2-beam BFN 987. The beam input ports 982 and 983 are interconnected within the single beam BFN 984 and 985 through multiple phase controllers 986. Consequently, the signal delivered to each beam input port 982 passes through a separate and unique combination of phase controllers 986 and is separately emitted from the radiating elements 988. Beam ports #1 and #2 deliver signals which produce first and second beams normal to wavefronts 989 and 990, respectively.

The BFN 987 may include more than 2 single BFNs 984 and 985 to produce more than 2 beams. When there is a large number of beams, the multiple beam BFN 987 is often implemented in the form of matrix circuits (such as Butler Matrix, Blass Matrix and Rotman Lens) to reduce the number of cross-over single paths. These matrix circuits are explained in many antenna textbooks such as the above referenced book entitled "Antenna Engineering Handbook, 3rd Edition", by Richard C. Johnson. FIGS. 1 and 2B illustrate transmitting direct radiating arrays (DRAs). In a receiving DRA, the solid state power amplifiers (SSPA) would be replaced by low noise amplifiers (LNA).

Figure 3A:
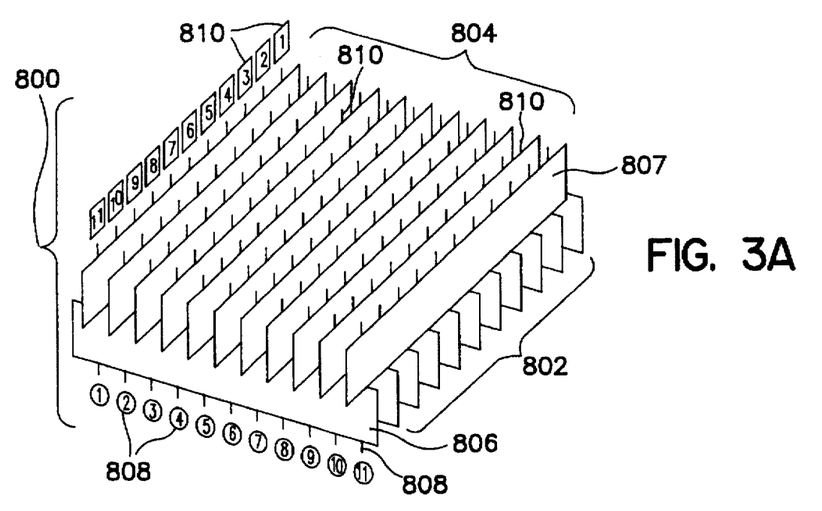
FIG. 3A illustrates a perspective view of a conventional 2-dimensional beam forming network using matrix circuits and having rectangular arrays of input beam ports and output feed ports.

FIG. 3A illustrates a multiple-beam BFN constructed with a plurality of matrix circuits for a two-dimensional array. The beam forming network 800 includes an x-axis matrix 802 and y-axis matrix 804. Each of the x and y axis matrices 802 and 804 are formed with 11 identical matrix circuits 806 (such as the single beam BFNs 984 and 985) aligned parallel to one another. Each matrix circuit 806 includes 11 beam ports 808 arranged along a length thereof. Each matrix circuit 807 includes 11 feed ports 810 extending along a length thereof. Consequently, the 11 matrix circuits 806 cooperate to provide 121 beam ports 808. Similarly, the matrix circuits 807 cooperate to provide 121 feed ports 810. In a conventional antenna system, feed ports 810 are connected to the 121 radiating elements of a square antenna array on a one-to-one basis. The matrix circuits 806 and 807 are interconnected through a plurality of phase controllers in a conventional manner (and as explained in the above text incorporated by reference). Consequently, a signal delivered to a beam port 808 is divided and output from all 121 feed ports 810. Further, each beam port signal, prior to being output from the feed ports 810, is passed through the plurality of phase controllers and emitted from the 121 feed ports in a time delayed manner to achieve beam redirection as explained above in connection with FIGS. 1, 2A and 2B. Each signal delivered to a beam port undergoes separate and unique phase shifts to achieve the predetermined time delay between outputs at the feed ports 810.

Figure 3B:
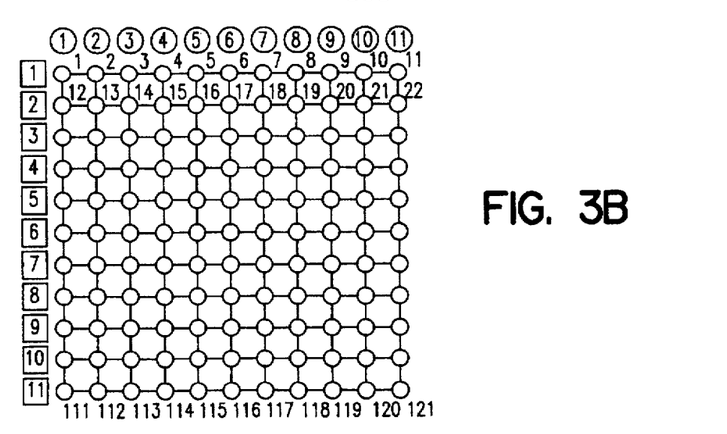
FIG. 3B illustrates a top plan view of a beam port layout according to the beam forming network of FIG. 3A.
Figure 3C:
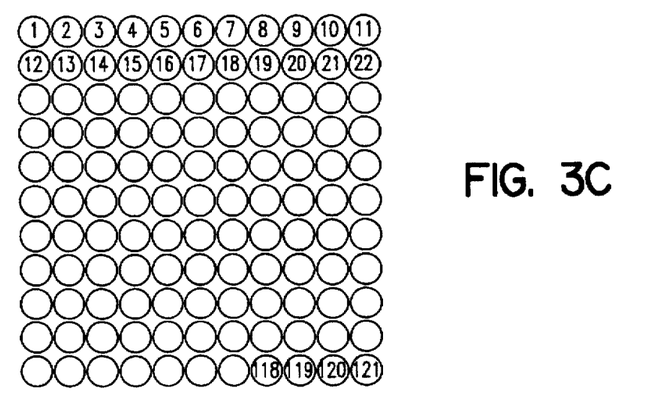
FIG. 3C illustrates a top plan view of a conventional resultant coverage beam pattern in which beams are formed in a square lattice.

FIG. 3B illustrates a conventional square matrix of 121 beam ports, while FIG. 3C illustrates a conventional square matrix of resultant beams produced by a square antenna array having 121 radiating elements at a coverage area in a far field region (e.g., at the surface of the earth). Corresponding beam ports and resulting beams are similarly numbered. When a signal is applied to beam port #1, the signal is separated into 121 components and distributed among the 121 feed ports 810 (FIG. 3A) as feed signals. Subsequently, the feed signals drive all 121 radiating or feed elements. The feed signal components, corresponding to the signal exciting beam port #1, are phase shifted between one another such that the resultant element beams emitted by the 121 radiating elements cooperate to define a resultant composite beam at beam location #1 (FIG. 3C). Similarly, a signal exciting beam port #18 is divided into 121 component feed signals and output to all 121 feed ports (FIG. 3A). The feed signals are phased shifted with respect to one another in order to produce feed beams which cooperate to define a resultant beam at beam location #18 in the resultant coverage beam layout.

Figure 4A:
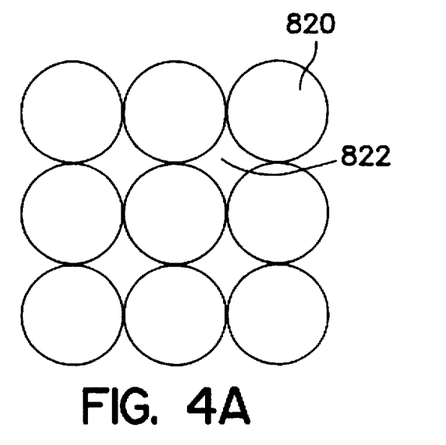
FIG. 4A illustrates a 3×3 matrix of resultant coverage beams arranged in a square lattice.

However, conventional antenna systems have met with limited success. As shown in FIG. 4A, resultant coverage beams 820, when formed in a square layout leave substantial gaps 822 therebetween. The gaps 822 are commonly referred to as "holes" and represent voids in the coverage region, from which RF signals are not detectable. Consequently, a rectangular beam layout is undesirable.

Figure 4B:
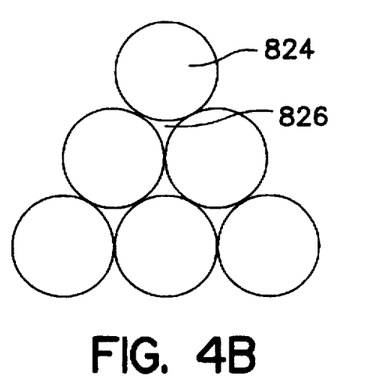
FIG. 4B illustrates a resultant coverage beam pattern arranged according to a triangular lattice.
Figure 4C:
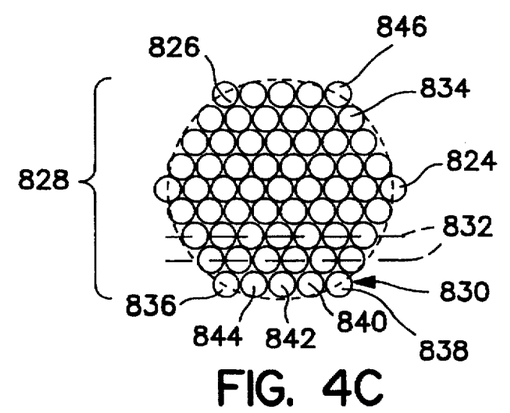
FIG. 4C illustrates a hexagon shaped resultant coverage beam layout.

To overcome the foregoing disadvantage, conventional antenna arrays have been proposed which align the radiating elements in a triangular lattice to produce coverage beams 824 in a similar arrangement (FIG. 4B). The triangular lattice substantially reduces the size of the holes or gaps 826 between coverage beams 824. In order to produce the triangular lattice, the radiating elements and coverage beams are arranged as in FIG. 4C, namely in a hexagon shaped layout. Antenna arrays forming a hexagon shaped coverage beam layout 828 (FIG. 4C) have also met with limited success. As shown in FIG. 4C, coverage beams 830 are aligned in rows along parallel axes 832.

However, a linear coverage pattern is not optimal. Generally, in satellite communications, the coverage beams combine to form a coverage area in the far field region (e.g., at the earth's surface) which is incident upon a spherical surface. Typically, the coverage area is displaced at an acute angle to the satellite, particularly where the satellite, as viewed from earth, is located proximate the horizon (i.e., when the coverage beams form a low elevation angle with respect to the surface of the earth). When the coverage beams form an acute angle to the earth's surface, the contour of the earth within the coverage area is arcuate. In fact, most covered regions upon the earth exhibit circular outlines at least along one side thereof (as indicated by arcuate dashed line 834). When viewing FIG. 4C, it is apparent that contour line 834 passes through the center of coverage beams 836 and 838. However, the contour line 834 also passes along the edge of coverage beams 840, 842 and 844. Consequently, coverage beams 840-844 experience difficulty in transmitting to and receiving from the devices located on the earth in regions immediately proximate the contour line 834.

In principle, the gain in the regions immediately proximate the contour line 834 can be improved by spreading beams further apart (i.e., increasing the beam-to-beam spacing) so that the contour line 834 passes through the center portions of beams 840, 842 and 844. However, a limit has been placed upon the degree to which the beam-to-beam spacing can be increased.

In particular, the International Telecommunications Union (ITU) has set forth limits upon the power flux density of transmissions beams emitted from satellites. Such limits are necessary to avoid interference between the satellite antenna arrays and terrestrial systems. The limits promulgated by the ITU at the low elevation angles (which corresponds to the regions outside the contour line 834) constrain the beams from spreading out too much. When the contour line 834 passes through the center portion of beams 840-844, the regions covered by beams 836 and 838 that is outside of contour line 834 have too much gain and exceed the ITU limits. Other adversarial effects of beam spreading are: (1) the holes 826 become deeper if beamwidths remain unchanged; or (2) the overall gain will be lower if the beamwidths are changed. Either case is not desired since it degrades the overall communication system's performance.

Due to the above problems, conventional antenna systems have provided limited capacity and availability. Capacity and availability refers to the number of earth based users which can communicate with the satellite.

In view of the foregoing, a need remains within the industry for an improved antenna system. It is an object of the present invention to meet this need.

SUMMARY OF THE INVENTION

It is a primary object of the present invention to provide an antenna system with enhanced capacity and availability for use in connection with telecommunications satellites.

It is a corollary object of the present invention to provide an antenna system which produces a coverage beam layout which more accurately follows the contour of the coverage area.

It is a further object of the present invention to provide an improved antenna system which avoids unnecessary holes or gaps between communications beams.

It is a further object of the present invention to provide an antenna system having a non-circular antenna array and beam forming matrix, but produces a circular beam layout.

It is a further corollary object of the present invention to provide an antenna system which reduces the number of interconnection leads within the beam forming network.

It is another object of the present invention to provide an antenna system capable of producing a circular beam pattern through pull-in and push-out beam redirection schemes.

These and other objects of the present invention are provided by an antenna system for a direct radiating array and the like. The antenna system includes an array of radiating elements formed in a non-circular layout, such as a hexagonal or square layout and a beam forming network having an upper level beam forming matrix and a lower beam connecting network. The beam connecting network receives coverage signals having unique frequencies, each of which corresponds to a separate coverage beam of similar frequency formed in the far field region. The beam connecting network divides each coverage signal into multiple component signals of differing amplitude and phase based on a weighting arrangement. The beam connecting network collects component signals from different coverage signals and outputs each collection of component signals a "singlet" signal. The singlet signals are delivered to the beam forming matrix. The beam forming matrix generates triangularly arranged feed signals each of which contains a sub-signal from each singlet signal. The beam connecting network includes weighting factors which adjust each component signal with respect to one another in order to redirect the resulting corresponding coverage beam. By redirecting the coverage beam, feed beams arranged in a triangular spaced lattice are combined to produce a circularly spaced resultant coverage beam layout. In the preferred embodiment, to generate 61 circularly-spaced beams, the beam forming matrix includes an 11×11 matrix of input and output ports. A hexagon shaped subsection of the input and output ports are utilized. The number of input and output ports is limited to the minimum necessary to achieve a circularly shaped resultant coverage beam layout of sufficient diameter in the far field region. The circularly spaced coverage beam layout is produced by combining clusters of component signals and weighting amplitudes and phases thereof in order to shift a resultant coverage beam inward or outward an amount necessary to align the resultant coverage beams in a circular pattern along concentric circles about the center of the coverage area.

The singlet beam signals may be weighted according to a "push-out" scheme to shift coverage beams outward until centered upon the desired arcuate path. Alternatively, the weighting scheme may be controlled according to a "pull-in" scheme, to shift coverage beams inward.

DETAILED DESCRIPTION OF THE PREFERRED EMBODIMENTS

The description of the preferred embodiment is provided in connection with an antenna system operating as a transmitter. However, it is to be understood that the inventive system is equally applicable to an antenna system operative as a receiver.

Figure 6B:
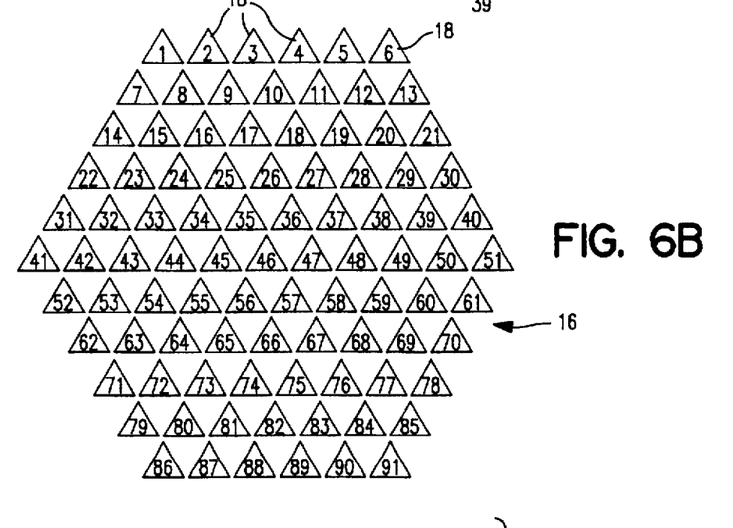
FIG. 6B illustrates a feed element layout driven by the feed port layout of FIG. 6A.
Figure 7:
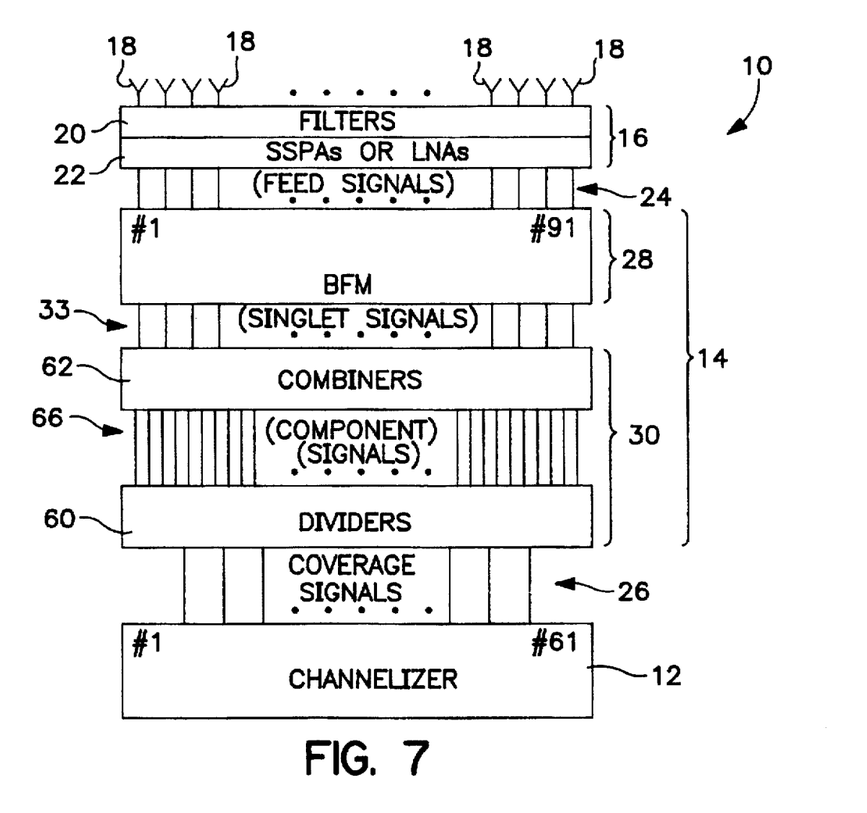
FIG. 7 illustrate a block diagram of an antenna system according to the present invention.

FIG. 7 illustrates an antenna system according to the present invention generally designed by the reference numeral 10. The antenna system 10 includes a channelizer 12 for channelizing all communications to and from the antenna system 10 on the communications satellite. The channelizer 12 interacts with a direct radiating array 16 through a beam forming network (BFN) 14, in order to receive incoming communications signals and to transmit outgoing communications signals. The direct radiating array (DRA) 16 includes a plurality of feed elements 18 arranged in a polygonal or non-circular layout, such as a square pattern, rectangular pattern, hexagonal pattern, polyhedral pattern and the like wherein adjacent feed elements 18 are aligned along a triangular lattice structure. For purposes for illustration only, the feed elements 18 are arranged in a hexagonal pattern (FIG. 6B).

As explained below, in a transmit mode the BFN 14 defines a weighting mapping relation between the coverage signals and feed signals by first converting the coverage signals to component signals and then converting the component signals to singlet signals. The singlet signals are then converted to feed signals. In a received mode, the feed signals are converted to singlet signals which are converted to component signals that are converted to coverage signals.

The feed elements 18 are interconnected with filters 20 which filter signals received from and transmitted to the feed elements 18. The filters 20 are in turn connected with amplifiers 22. The amplifiers 22 may represent low noise amplifiers (LNA) when the direct radiating array 16 is being utilized to receive communications signals. The amplifiers 22 may represent solid state power amplifiers (SSPA) when the direct radiating array (DRA) 16 is utilized as a transmitter. The number of feed elements 18 may vary.

The amplifiers 22 interconnect with the beam forming network (BFN) 14 through feeds ports 24. A unique feed port 24 is assigned to each feed element 18. When in a transmit mode, the feed ports 24 deliver feed signals to corresponding feed elements. Similarly, when in a receive mode, the feed ports 24 receive feed signals from corresponding feed elements 18.

When in a transmit mode, each feed element 18 emits a corresponding unique feed beam based on the corresponding excitation feed signal. When in a receive mode, each feed element 18 produces a feed signal based on a received feed beam. In transmit or receive modes, the feed beams cooperate to define singlet beams which combine to form coverage beams which relay communications RF signals to and from ground based units, such as mobile cellular telephone stations, fixed telephone stations and the like. As explained below, each feed beam generated or received by a feed element 18 comprises multiple beam components having different frequencies, amplitudes and phases with respect to one another. According to the invention, the beam components cooperate to define coverage beams of differing frequencies arranged in a circular layout (FIGS. 9 and 10B) in a coverage area in a far field region (as explained in more detail below). The inventive system controls the amplitude and phase of the beam components in order to enable a DRA 16 having feed elements 18 arranged in a polygonal layout and aligned along a triangular lattice structure to produce a circular coverage beam pattern.

Figure 9:
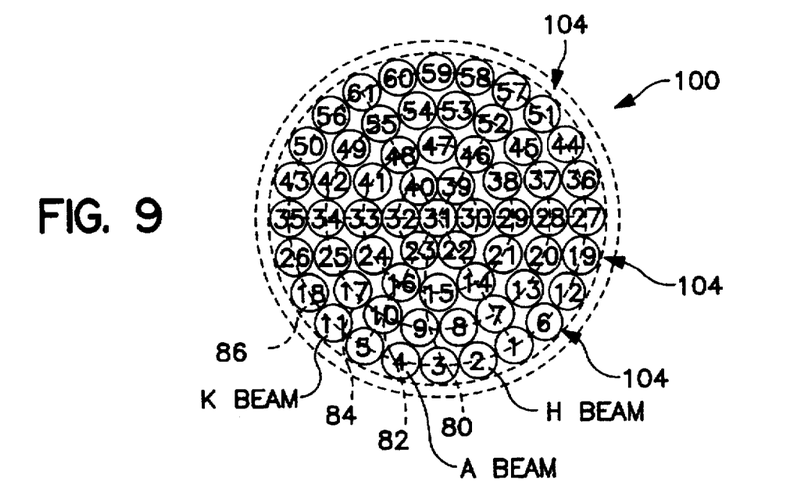
FIG. 9 illustrates a circular coverage beam layout produced according to present invention in connection with a "push-out" weighting scheme.
Figure 10A:
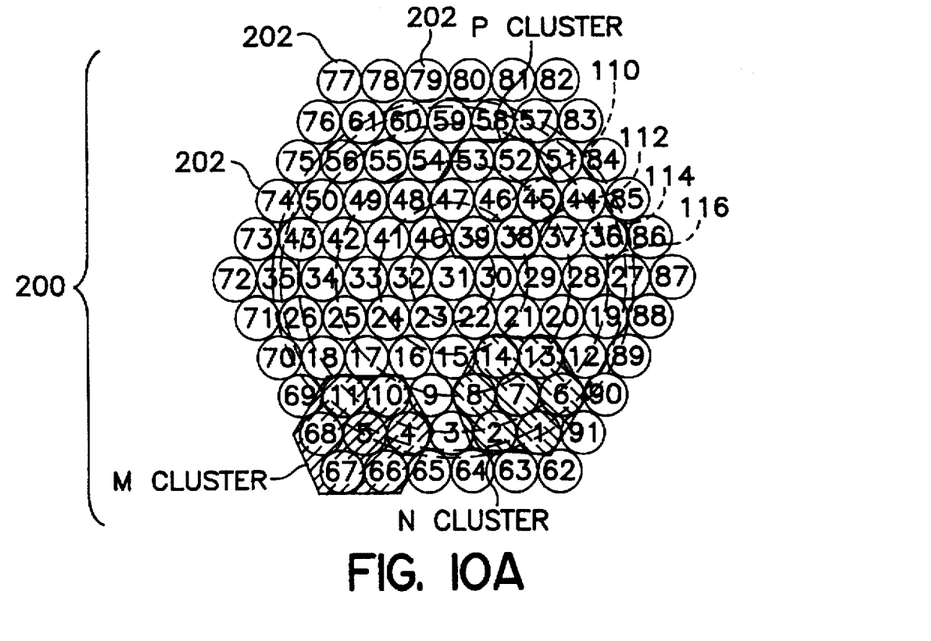
FIG. 10A illustrates a singlet beam layout according to the present invention.
Figure 10B:
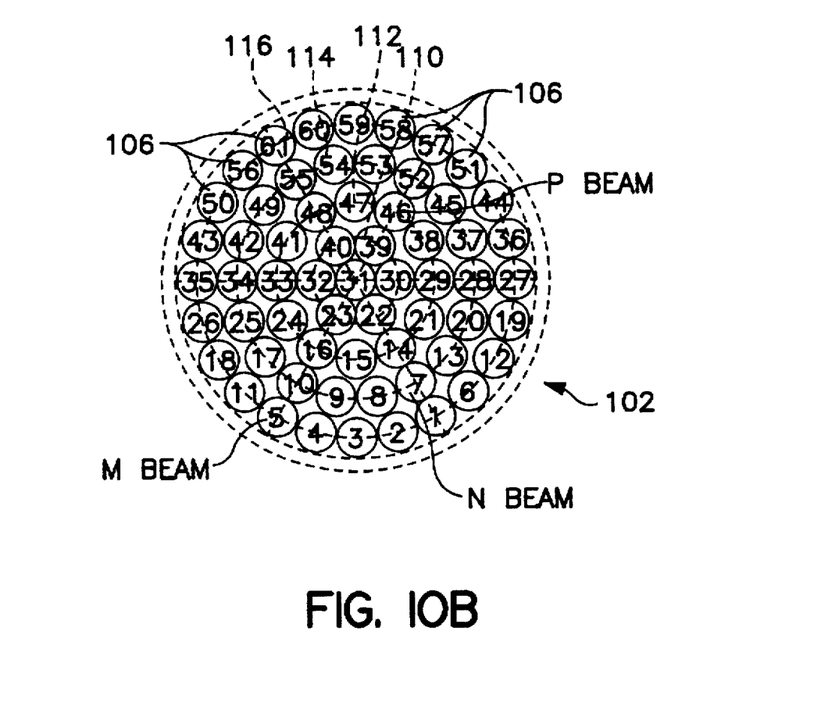
FIG. 10B illustrates a circular coverage beam layout produced according to the present invention in connection with a "push-in" weighting scheme.

FIGS. 9 and 10B illustrate resultant coverage beam areas generally designated 100 and 102, respectively. The coverage areas 100 and 102 are circular. The coverage area 100 results from a "push-out" beam redirection or weighting scheme according to the present invention, while the coverage area 102 results from a "pull-in" beam redirection or weighting scheme. The coverage areas 100 and 102 include a plurality of coverage beams 104 and 106, respectively, centered along concentric circles 80, 82, 84 and 86, and 110, 112, 114 and 116, respectively.

The coverage areas 100 and 102 are incident upon a region of the earth's surface (also referred to as a "far field region" from the antenna system).

Returning to FIG. 7, the beam forming network (BFN) 14 further includes a plurality of beam ports 26 which convey composite or coverage signals of differing frequency to and from the channelizer 12. The coverage signals conveyed by the beam ports 26 between the channelizer 12 and BFN 14 uniquely correspond to similarly numbered coverage beams 104 and 106 (as illustrated in FIGS. 9 and 10B) of corresponding frequency. Thus, during a transmit mode, when the controller 12 generates a coverage signal at beam port #1, the BFN 14 and DRA 16 cooperate, as explained below, to define a coverage beam 104 or 106 at the location denoted beam #1 in the coverage area 100 or 102 in the far field region. In the example of FIG. 7, the system utilized 61 beam ports 26. Accordingly, the BFN 14 and DRA 16 cooperate to define 61 coverage beams in the far field region arranged as shown in FIGS. 9 and 10B. However, any number of coverage beams and beam ports may be used.

Next, the description turns to FIGS. 5 and 6A–6D. FIG. 6B illustrates a DRA 16 layout for 91 feed elements 18. For purposes of illustration, the feed elements 18 have been denoted with reference numerals 1–91. The feed elements 18 are arranged in a hexagonal layout along a triangular lattice. The feed elements 18 emit adjacent feed beams which substantially maintain the hexagonal pattern throughout transmission, to a far field region. The feed beams define a fed beam layout at the far field region, (e.g. at the surface of the earth).

Figure 5:
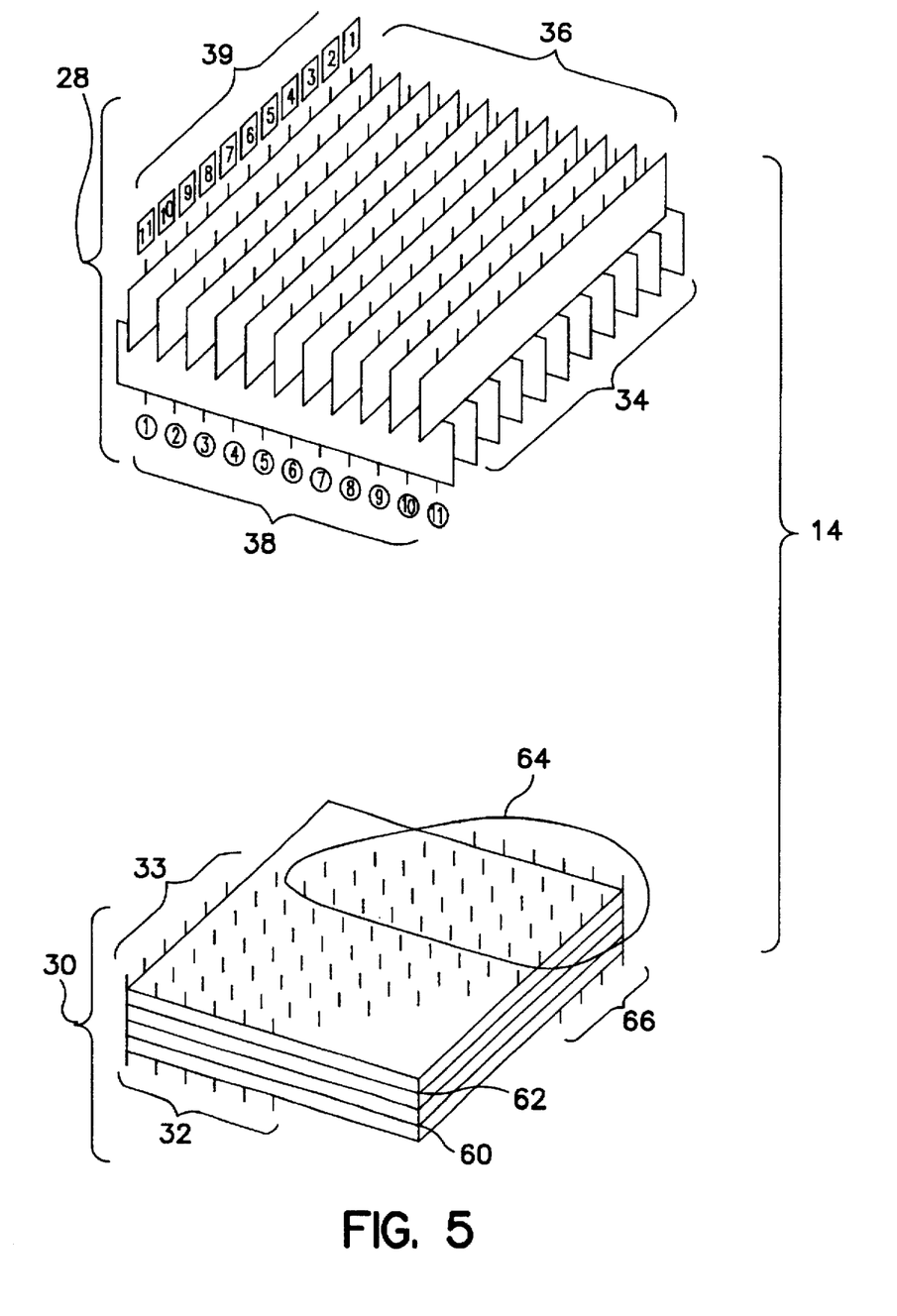
FIG. 5 illustrates a beam forming network according to the present inventions.

With reference to FIG. 5, the BFN 14 includes a beam forming matrix (BFM) 28 and a beam connecting network (BCN) 30. The BFM 28 may comprise of a plurality of conventional matrices, such as a Butler matrix, a Blass matrix, Rotman Lens and the like. Butler, Blass and Rotman Lens matrices are understood within the field and set forth in the book entitled, "Antenna Engineering Handbook, 3rd Edition", by Richard C. Johnson, published by McGraw-Hill, Inc., 1993, which is incorporated herein by reference. Blass matrices are described in the incorporated book at section 20-58. Butler matrices are described in the incorporated book at sections 9-10 and 20-59. Rotman lenses are described in the incorporated book at Section 16-7. The BFM 28 includes x and y matrices 34 and 36 having a plurality of input and output leads 38 and 39, respectively. In the example of FIG. 5 the x and y matrices 34 and 36 include 11 rows and 11 columns of leads and consequently present 121 input and output leads. The output leads 39 may represent the feed ports 24 connected to the feed elements 18. The input leads 38 include a subset of leads which represent singlet leads 33 excited by "singlet" signals which are explained in more detail below.

When an input signal is delivered to an input lead 38, this signal is separated in multiple sub-signals, each of which is delivered to a corresponding output lead 39 and consequently to a corresponding feed port 24. In addition, the x and y matrices 34 and 36 in the BFM cooperate to induce phase shifts (e.g., time delays) between the sub-signals delivered to each of the feed ports 24. The phase shifts are defined by the matrix circuits. Consequently, when an input signal is delivered to one of the input leads 38, this input signal is divided into sub-signals and distributed among the feed ports 24. The sub-signals are phase shifted with respect to one another such that the resulting feed beams cooperate to define a singlet coverage beam 19 (FIG. 6D) at a desired position within the coverage area at the far field region.

Figure 6A:
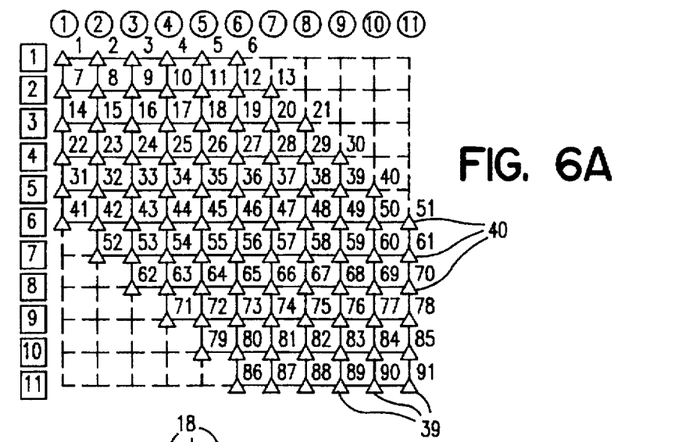
FIG. 6A illustrates a top plan view of a feed port layout according to the present invention.

FIG. 6A illustrates an output lead layout from the BFM 28 which is connected to the DRA 16. While the BFM 28 offers 121 output leads 39, in accordance with the present invention, only 91 of the output leads 39 are used. These 91 leads 39 represent a subset and have been denoted #1–#91. Corresponding leads 39 in the subset and feed elements have been similarly designated in FIGS. 6A and 6B. For instance, lead #1 is attached to feed element #1. Similarly, lead #41 excites feed element #41. Each feed element 18 produces a feed beam corresponding to the excitation feed signal received from a similarly numbered lead 39 (FIG. 6A).

Figure 6C:
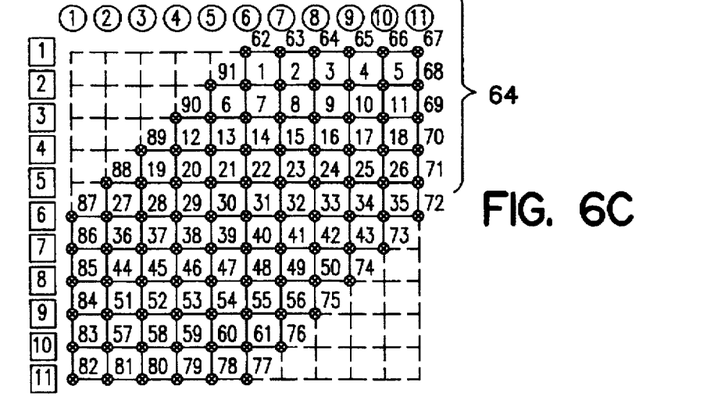
FIG. 6C illustrates a singlet lead layout according to the present invention.

Turning to FIG. 6C, a layout is illustrated for the singlet leads 33 utilized in connection with the present invention. While the BFM 28 also offers 121 input leads 38, the inventive system only utilizes a subset thereof as singlet leads 33 to drive the desired hexagonally shaped DRA 16. As shown in FIG. 6C, 91 singlet leads 33 extend diagonally across the center of the BFM 28. Singlet signals delivered to each singlet lead 33 are distributed among all of the output leads 39.

Figure 6D:
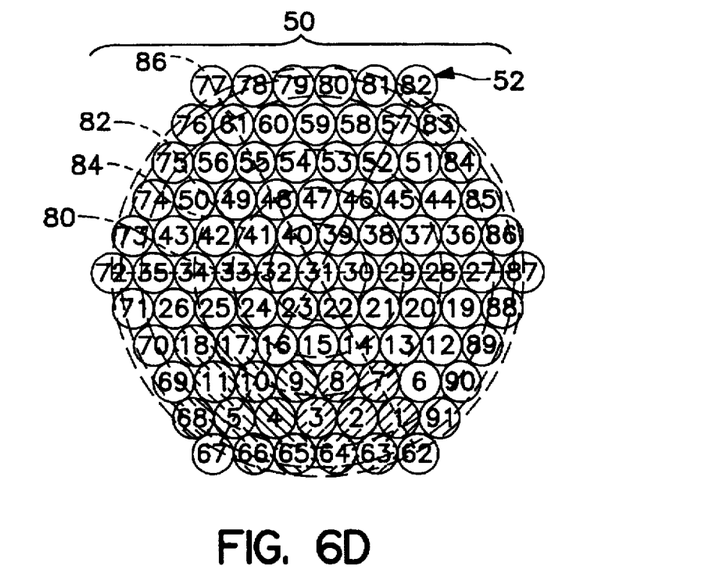
FIG. 6D illustrates a singlet beam configuration produced in connection with the singlet lead layout of FIG. 6C.

FIG. 6D illustrates singlet beam layout 50 formed at the far field region by the DRA 16. The layout includes a plurality of singlet beams 52. The singlet beams 52 are produced based on singlet signals delivered to the singlet leads 33 shown in FIG. 6C. Like reference numerals have been assigned to each singlet lead 38 (FIG. 6C) and the corresponding singlet beam 52 (FIG. 6D). For instance, a signal produced on singlet lead #1 (FIG. 6C, row 2, column 6) produces singlet beam #1 (FIG. 6D located in lower right corner of the layout). Similarly, input signals produced on singlet leads #77–#82 (FIG. 6C, row 11, columns 1–6) produce resultant singlet beams #77–#88 (FIG. 6D, the top row of the layout). The interrelation between singlet leads 38 and singlet beams 52 shown in FIGS. 6C and 6D have been determined through the phase distribution of the 91 feed signals at the output lead 39 for every "singlet" signal at the input lead 38. The phase distribution of the 91 feed signals at the output lead 39 for every "singlet" signal is determined by tracing the transmission path of every "singlet" single to all 91 output leads 39 and adding up the insertion phase as defined in the X and Y matrices 34 and 36 along that path.

Returning to FIG. 5, the BCN 30 includes a divider layer 60 and a combiner layer 62 aligned within parallel planes. The divider layer 60 receives coverage beam signals from the channelizer 12 through beam ports 26 which correspond to input leads 32. The combiner layer 62 generates "singlet" signals upon output leads 33 which are directly connected to singlet leads 38. As explained below, each singlet signal contains components of multiple coverage beam signals. The details of the BCN 30 are described in the co-pending application referred to above and incorporated herein by reference. Accordingly, the BCN 30 is described only briefly hereafter in connection with FIG. 11.

Figure 11:
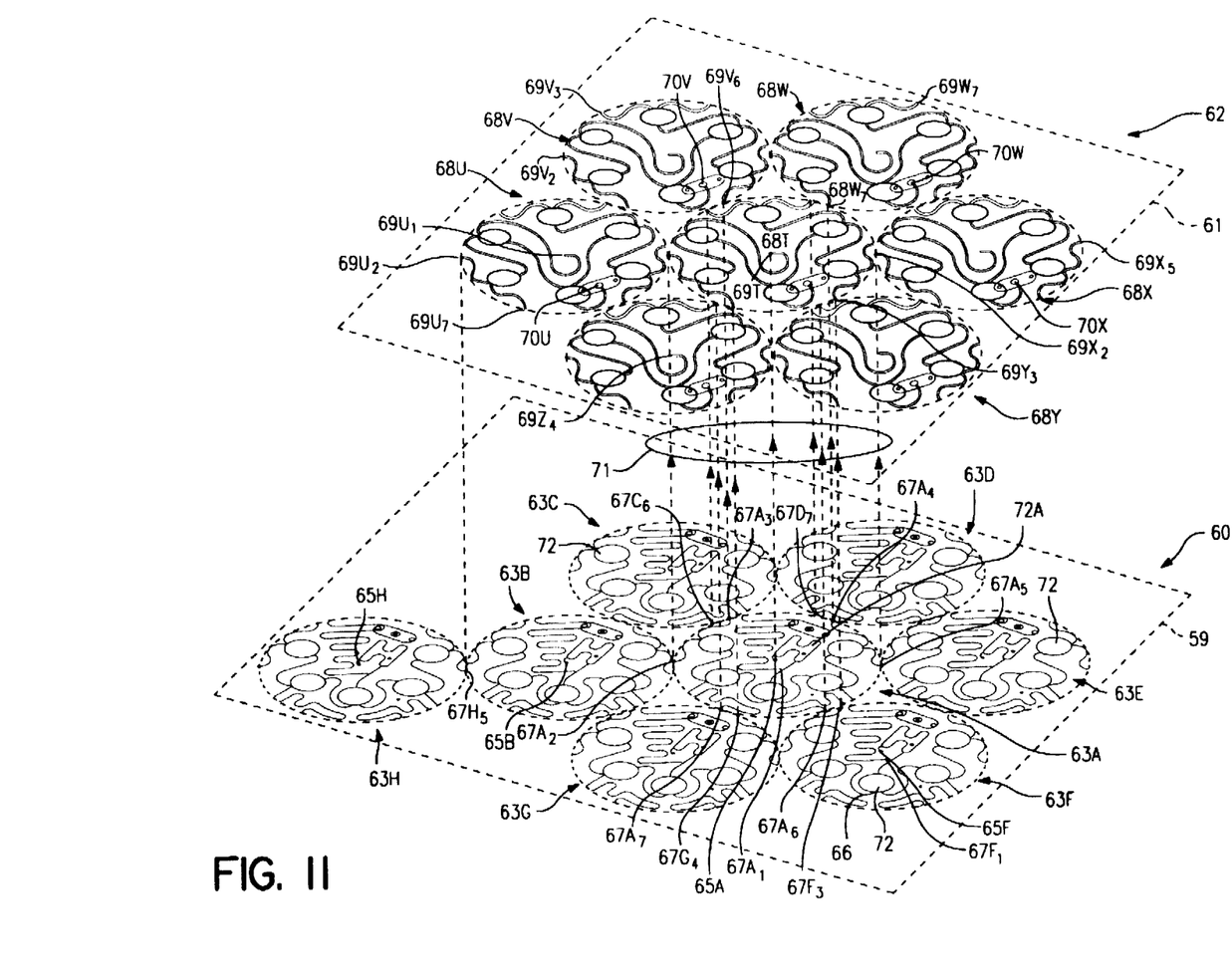
FIG. 11 illustrates a perspective view of a subsection of the beam connecting network.

FIG. 11 illustrates a representative subsection of the divider and combiner layers 60 and 62 aligned parallel to one another. The divider layer 60 includes a plurality of divider elements 63A-63H distributed across a divider circuit trace within a common plane (generally designated by the dashed polyhedral-line 59). Each divider element 63A-63H includes an input terminal 65A-65H uniquely connected to one of the input leads 32 (FIG. 5) which delivers the corresponding coverage signal. The input leads 32 correspond to the beam ports 26 in FIG. 7 which receive the coverage signals from the channelizer 12. Each divider element 63A-63H includes a plurality of output terminals $67A_1$–$67A_7$, $67B_1$–$67B_7$, etc., connected to the input terminals 65A-65H via lead traces 66. By way of example only, each divider element 63 may include a plurality of 2-way dividers 72 interconnected through the leads 66. The coverage signal received at the input terminal is split into a predefined number of components (equalling the number of output terminals).

The amplitude of each component is proportional to the amplitude of the incoming coverage signal. The inter-relation of the component amplitudes is dependent upon the configuration of leads 66 and 2-way dividers 72. The amplitude of each component is also dependent on the thickness or size of the leads 66. For instance, a coverage signal "A" delivered at input terminal 65A may be split in half at a first divider 72A, with a first half of signal A going to a first output terminal $67A_1$ and the remaining half of signal A being distributed among the remaining output terminals $67A_2$–$67A_7$. Thus, by varying the thickness and configuration of the leads 66, the divider element 63A induces a weighting factor into the output component signals $A_1$–$A_7$, wherein desired output terminals produce differing amplitude and/or phase components with respect to one another. By way of example, the output terminals $67A_1$, $67A_2$ and $67A_3$ may produce output component signals $A_1$, $A_2$ and $A_3$ having amplitudes equaling 50%, 30% and 20% of the incoming coverage signal A at terminal 65A. The weighting factor between the output terminals $67A_1$–$67A_7$ may be adjusted as desired. In a more general case, the weighting factor may include both amplitudes and phases adjusted as desired.

The output terminals 67 deliver unique corresponding component signals to the combiner layer 62. The combiner layer 62 includes a plurality of combiner elements 68 distributed along a combiner circuit trace within a common plane (generally designated by the polyhedral-line 61). Each combiner element 68T-68Z includes multiple input terminals $69T_1$–$69T_7$, $69U_1$–$69U_7$, ..., $69Z_1$–$69Z_7$ and a single output terminal 70T-70Z. The combiner elements 68T-68Z collect incoming component signals from the input terminals and output cumulative or collective signals, referred to hereafter as "singlet" signals. Each singlet signal contains multiple component signals.

As explained in the co-pending application referenced above, the combiner and divider elements 63A-63G and 68T-68Z are clustered or grouped within the parallel planes such that divider output terminals are connected with combiner input terminals located immediately adjacent thereto. By way of example, the illustrated combiner elements have been labelled 68T-68Z and receives component signals $A_1$–$A_7$ of the coverage signal A. The output terminals $67A_1$–$67A_7$ of divider 63A are connected to input terminals $69T_1$–$69Z_7$ of combiner elements 68T-68Z, respectively. The combiner elements 68T-68Z separately produce seven unique singlet signals T-Z, each of which contains a corresponding component signal ($A_1$–$A_7$) of the coverage beam signal A. While not discussed in detail, it is understood that each combiner element 68T-68Z receives component signals from multiple divider elements. For instance, combiner element 68T may receive component signals $A_1$, $B_5$, $C_6$, $D_7$, $E_2$, $F_3$ and $G_4$ from seven adjacently clustered dividers 63A-63G. Similarly, combiner element 68X may receive component signals $A_5$, $D_6$, $E_1$ and $F_4$, respectively. Combiner element 68X may receive three additional component signals from divider elements adjacent elements 63D-F (not shown in FIG. 11). According to this example, combiner element 68T will output a singlet signal T comprising one component signal from each of divider elements 63A-63G (e.g., component signals $A_1$, $B_5$, $C_6$, $D_7$, $E_2$, $F_3$, and $G_4$). The singlet signals excite singlet leads 33 and input leads 38 of the BFM 28.

As explained above, the BFM 28 and DRA 16 cooperate to produce a singlet beam layout 50 in the far field region having a hexagonal layout. Each singlet beam 52 retains a one-to-one relationship with a corresponding singlet signal at one of the singlet leads 33. FIGS. 6C and 6D illustrate the inter-relation between singlet leads 33 and singlet beams 52.

Next, the discussion turns to the method by which the invention redirects and weights singlet beams 52 to form a circular coverage beam layout 100 as shown in FIG. 9, in which the coverage beams 104 are distributed along concentric circles 80, 82, 84 and 86. Each coverage beam 104 uniquely corresponds to one of the coverage signals at beam ports 26. The inventive system aligns the coverage beams 104 circularly through a push-out weighting scheme (to achieve the alignment in FIG. 9) and through a pull-in weighting scheme (to achieve the alignment in FIG. 10B). The push-out and pull-in schemes are accomplished within the BCN 30 through weighting of the components of each coverage beam signal, as explained below.

Figure 8A:
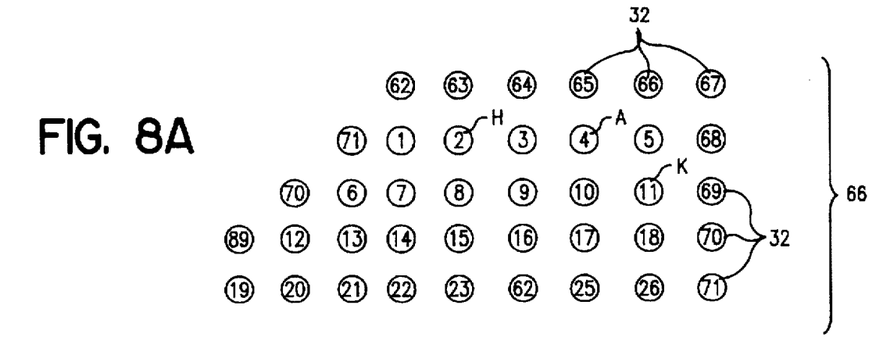
FIG. 8A illustrates a subsection of the beam port layout input to the beam connecting network.

FIG. 8A illustrates a subsection 66 (FIG. 5) of input leads 32. The input leads 32 receive coverage signals from the channelizer 12. The coverage signals produce the coverage beam layout 100 of FIG. 9. The input leads 32 and coverage beams 104 have been similarly numbered to illustrate for example that coverage signals A, H and K used to excite leads #4, #2 and #11 will induce coverage beams A, H and K at beam locations #4, #2 and #11, respectively.

Figure 8B:
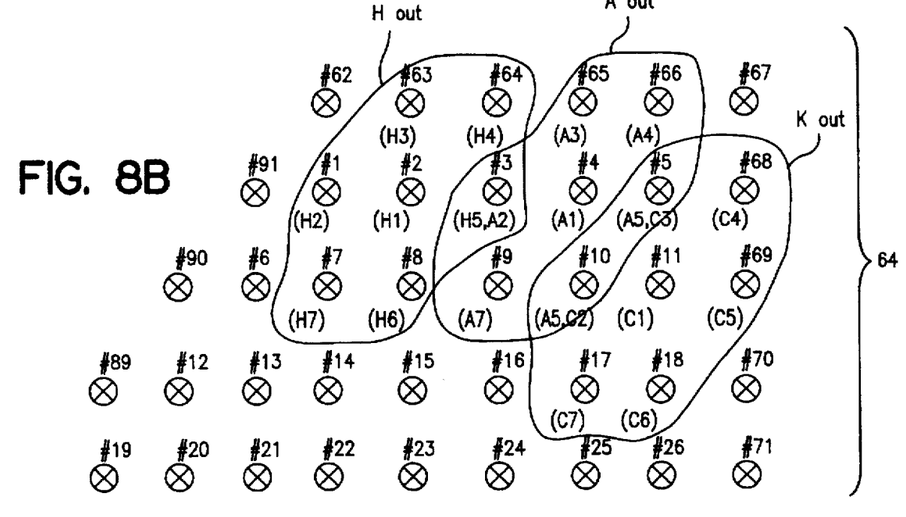
FIG. 8B illustrates a subsection of the singlet lead layout output by the beam connecting network.

FIG. 8B illustrates a subsection 64 of singlet leads 33 used to excite the BFM 28. As explained in connection with FIG. 11, clusters of singlet leads receive components of coverage beam signals. In the preferred embodiment, once the divider layer 60 divides the coverage beam signal A into seven component signals $A_1$–$A_7$, the component signals $A_1$–$A_7$ are delivered to corresponding combiners 68T-68Z within the combiner layer 62. Combiners 68T–68Z deliver the component signals $A_1$–$A_7$ to singlet leads #4, #3, #65, #66, #5, #10 and #9 (FIG. 8B). The group or cluster of singlet leads #3–5, #9–10 and #65–66 have been collectively denoted in FIG. 8B as $A_{OUT}$ and output component signals $A_1$–$A_7$ at a common frequency, but different amplitudes and phases. The cluster of singlet leads $A_{OUT}$ containing the component signals $A_1$–$A_7$ are grouped to minimize the length of interconnections and number of crossovers. In the BFM 28, the components $A_1$–$A_7$ are split into sub-signals and delivered through the matrix output leads 39 to all of the feed elements 18 in the DRA 16. The DRA 16 in turn produces singlet beams 52 (FIG. 6D) at locations #3–5, #9–10 and #65–66 (collectively referred to as singlet cluster $A_{CLSTR}$. Singlet beam cluster $A_{CLSTR}$ is illustrated with diagonal dashed lines. Each of singlet beams #3–5, #9–10 and #65–66 contains a corresponding unique component beam signal $A_1$–$A_7$. The component beam signals $A_1$–$A_7$ have a common frequency and cooperate to produce a resultant coverage beam $A_{BEAM}$ (FIG. 9) corresponding in frequency and amplitude to coverage signal A input to the BFN 14. While the center of singlet beam cluster $A_{CLSTR}$ is at singlet beam #4 which is inside of the concentric circle 86, the center of the resultant coverage beam $A_{BEAM}$ is shifted outward to be centered on concentric circle 86. This shift is accomplished by setting the amplitudes of component signals $A_3$–$A_5$ (at singlet beams #65, #66 and #5) greater than the amplitude of component signals $A_2$, $A_6$ and $A_7$ (at singlet beams #3, #10 and #9). The amplitudes and phases of component signals $A_1$–$A_7$ are defined relative to one another by divider 63A, which induces predefined weighting factors therebetween. For instance, the divider 63A may vary the weighting factor to increase the amplitude of component signal $A_7$ at output terminal 67$A_7$ (FIG. 11) in order to similarly increase the amplitude of component beam signal $A_7$ at singlet beam #66, in order to further shift the coverage beam $A_{BEAM}$ (FIG. 9) outward relative to the center of singlet cluster $A_{CLSTR}$ (FIG. 6D).

As a second example, the process is described whereby a coverage beam $H_{BEAM}$ (FIG. 9) is shifted and redirected until centered on concentric circle 86. Coverage beam $H_{BEAM}$ corresponds to coverage signal H generated by the channelizer 12 (FIG. 7). The coverage signal H is applied to input lead #2 (FIG. 8A) of the BCN 30. Responsive thereto a corresponding divider element (63H FIG. 11) within the divider layer 60 divides the coverage signal H into component signals $H_1$–$H_7$ and delivers the component signals $H_1$–$H_7$ to corresponding combiners within the combiner layer 62. With reference to FIG. 11, combiner element 68U receives component signal $H_5$ at input terminal 69$U_2$ from output terminal 67$H_5$ of divider element 63H. The combiner element 68U groups the component signals $A_2$ and $H_5$ (along with five other component signals received at terminals 69$U_1$, 69$U_3$–69$U_4$ and 69$U_6$–69$U_7$) to form a singlet signal which is output at singlet lead #3 (FIG. 8B).

In a similar manner, the combiners output the component signals $H_1$–$H_7$ (of common frequency) which excite corresponding singlet leads (#2, #1, #63, #64, #3, #8 and #7 denoted $H_{OUT}$ in FIG. 8B). The component signals $H_1$–$H_7$ excite the BFM 28, are split into subsignals, distributed throughout the BFN 28 and delivered to the feed elements 18. The DRA 16 in turn produces feed beams which cooperate to define singlet beams #1–3, #7, #8, #63 and #64 (collectively designated as beam cluster $H_{CLSTR}$ in FIG. 6D). The singlet beams in singlet cluster $H_{CLSTR}$ contain beam components having a frequency corresponding to component signals $H_1$–$H_7$ which cooperate to produce a coverage beam $H_{BEAM}$ (FIG. 9) of common frequency. While the center of the singlet cluster $H_{CLSTR}$ is located inside circle 86, the center of coverage beam $H_{BEAM}$ is shifted outward to be centered on circle 86. This shift is accomplished by setting the amplitude of component beam signals $H_2$, $H_3$ and $H_4$ (at singlet beams #1, #63 and #64) greater than the amplitude of component beam signals $H_5$, $H_6$ and $H_7$ (at singlet beam #3, #8 and #7). The amplitudes of component beam signals $H_1$–$H_7$ are defined by predetermined weighting factors within divider element 63H. Specifically, in divider element 63H, the thickness and configuration of lead traces 66 and 2-way dividers 72 are varied to ensure that each of component signals $H_1$–$H_7$ has an amplitude necessary to redirect the coverage beam $H_{BEAM}$ outward from the center of singlet cluster $H_{CLSTR}$ until centered upon concentric circle 86.

Through a similar process, it is understood that coverage beam $K_{BEAM}$ (FIG. 9) may be formed from singlet cluster $K_{CLSTR}$ (FIG. 6D). According to the foregoing process, singlet beams are generated from a polyhedral feed element array. The singlet beams are clustered and driven by component signals from desired coverage signals. The component signals of common frequency within each cluster are varied in amplitude and phase with respect to one another to produce a redirected coverage beam. The center of the coverage beam is shifted outward from the center of the singlet cluster to produce a coverage beam pattern, the coverage beams of which are aligned along concentric circles.

For the purpose of explanation, seven singlet beams are amplitude-weighted to form a coverage beam in the above description. In general, a coverage beam may be formed by any number of singlet beams with both amplitude and phase weightings.

In the foregoing manner, the BFN 14 defines a weighted mapping relation between the coverage signals and the feed signals.

FIGS. 10A and 10B illustrate an alternative embodiment, in which a pull-in weighting routine converts a singlet beam pattern 200 into a coverage area 102. The singlet beam pattern 200 includes a plurality of singlet beams 202 formed in a polyhedral layout from a similar polyhedral array of feed elements. The BCN 30 forms singlet clusters, such as $M_{CLSTR}$, $N_{CLSTR}$ and $P_{CLSTR}$ (FIG. 10A), from singlet beams which carry component signals $M_1$–$M_7$ (beams #4–5, #10–11 and #66–68), $N_1$–$N_7$ (beams #1–2, #6–8 and #13–14), and $P_1$–$P_7$ (beams #38–39, #45–47 and #52–53). Clusters $M_{CLSTR}$, $N_{CLSTR}$ and $P_{CLSTR}$ produce coverage beams $M_{BEAM}$, $N_{BEAM}$ and $P_{BEAM}$, respectively. It is desirable to shift the center of clusters $M_{CLSTR}$, $N_{CLSTR}$ and $P_{CLSTR}$ inward to be centered on concentric circles 116, 114 and 112, respectively.

To redirect coverage beam $M_{BEAM}$ (FIG. 10B), the amplitudes of component signals $M_3$–$M_5$ (beams #11, #10 and #4) are set greater than the amplitudes of component signals $H_2$ and $H_6$–$H_7$ (beams #68, #66 and #67). To center beam $N_{BEAM}$ on circle 114, the amplitudes of component signals $N_2$–$N_4$ (beams #8, #14 and #13) are set greater than the amplitudes of component signals and $N_5$–$N_7$ (beams #6, #1 and #2). To center $P_{BEAM}$ on circle 112, the amplitudes of component signals $P_2$ and $P_6$–$P_7$ (beams #47, #38 and #39) are set greater than the amplitudes of component signals $P_3$–$P_5$ (beams #53, #52 and #45). By weighting the singlet clusters as explained above, the center of each coverage beam formed by a cluster is shifted or redirected inward until centered on a corresponding one of concentric circles 110–116. This weighting process "pulls-in", the coverage beams.

It is to be understood that, while the preferred embodiment illustrates the use of an 11×11 matrix of input and output matrix circuits, the present invention is not limited to this configuration. The 11×11 matrix may be used to generate 61 circularly spaced beams. However, any number of circularly spaced beams may be used and thus any size matrix may be used. In general, a N×N matrice may be used to produce M beams. For a fixed number of beams M, there are many possible values for N. For instance, if M equals 19, 37, 61 or 91 beams, the matrix may be a 7×7, 9×9, 11×11 or 13×13 and the like.

While some preferred embodiments of the invention have been described in detail, these are to be considered exemplary only and not as limitations on the scope of the invention.

I claim:

1. An antenna system for receiving or transmitting communications signals between a communications satellite and earth based unit located within a coverage area of said system, said system defining a plurality of coverage beams forming said coverage area in a far field region, said system comprising:

an antenna array containing a plurality of feed elements which cooperate to receive or transmit coverage beams arranged in a circular layout in a coverage area in a far field region, said feed elements being arranged in a non-circular layout; and a beam forming network containing a plurality of beam ports and feed ports, said feed ports conveying feed signals related to said coverage beams, said feed ports conveying said feed signals between said beam forming network and said feed elements, said beam ports conveying coverage signals between said beam forming network and the communications satellite, each of said coverage signals uniquely corresponding to one of said coverage beams, said beam forming network defining a weighted mapping relation between said feed signals and said coverage signals such that said feed elements arranged in said non-circular layout cooperate to receive or transmit coverage beams arranged in a circular layout in said coverage area.

2. The system of claim 1, wherein said beam forming network divides said coverage signals into component signals and groups said component signals into clusters, each cluster containing component signals from at least two coverage signals, said beam forming network formed each cluster of signal components into a corresponding singlet signal, said beam forming network outputting said feed signals based on said singlet signals, said feed elements transmitting said feed beams based on said feed signals.

3. The system of claim 1, wherein said non-circular array of feed elements receives incoming coverage beams from said coverage area arranged in said circular layout, said feed elements outputting feed signals corresponding to said incoming coverage beams, said beam forming network transforming said feed signals into said component signals and combining predetermined component signals, based on a predefined weighted mapping scheme, to form said coverage signals, each coverage signal corresponding to one of said coverage beams.

4. The system of claim 1 wherein said beam forming network includes a beam connecting network for converting said coverage signals into singlet signals, each singlet beam signal containing components from a predetermined number of coverage signals, said beam connecting network varying an amplitude of said components to redirect said coverage beams into said circular layout at said coverage area said beam forming network converting said singlet signals to said feed signals.

5. The system of claim 1, wherein each coverage signal and associated coverage beam has a unique frequency, said beam forming network including a beam connecting network for dividing each coverage signal into multiple signal components having a predetermined common frequency and different amplitudes, said predetermined amplitudes being set to direct said feed elements arranged in said non-circular layout to cooperate to transmit said coverage beams in said circular layout.

6. The system of claim 1, wherein said beam forming network includes a beam forming matrix for subsignals components of said coverage signal phase shifted with respect to one another.

7. The system of claim 1, wherein said beam forming network includes a beam forming matrix and a beam connecting network, said beam connecting network dividing said coverage signal into weighted component signals of differing amplitude and collecting sub-sets of said component signals to produce singlet signals therefrom, said beam forming matrix converting said singlet signals to said feed signals.

8. The system of claim 1, wherein said feed elements define feed beams which cooperate to define singlet beams, each singlet beam containing components of multiple coverage beams, said feed elements defining said singlet beams in a non-circular layout, wherein singlet beams having components from a single coverage beam are clustered adjacent one another in a singlet cluster and interact to define a corresponding coverage beam, said corresponding coverage beam having a center shifted from a center of said singlet cluster.

9. The system of claim 1, wherein said feed elements are arranged in a hexagonal layout, each feed element defining a feed beam, said feed beams cooperating to define singlet beams arranged in a hexagonal layout, said singlet beams cooperating to define said coverage beams in a circular layout.

10. The system of claim 1, wherein said beam forming network defines said weighted mapping relation by dividing each coverage signal into multiple components signals differing in at least one of amplitude and phase with respect to one another.

11. A method for defining and redirecting a plurality of coverage beams received by or transmitted from a communications satellite, said coverage beams being arranged in a circular layout at a coverage area in a far field region, said method comprising the steps of:

defining a one to one relation between a plurality of coverage signals and a unique corresponding plurality of coverage beams arranged in a circular layout;

conveying feed signals to or from an antenna array having a plurality of feed elements arranged in a non-circular layout, said feed elements operating in connection with said plurality of coverage beams arranged in said circular layout;

defining a mapping relation between said feed signals and a plurality of component signals, wherein said component signals are arranged in clusters, each of said clusters corresponding to a unique coverage signal;

defining a mapping relation between each cluster of component signals and a corresponding unique coverage signal; and setting at least one of amplitudes and phases of said component signals in a cluster unevenly with respect to one another to align said coverage beams in said circular layout at said coverage area.

12. The method of claim 11, further comprising the steps of:

dividing said coverage signals into said component signals and grouping said component signals into clusters to form singlet signals, each of said singlet signals containing component signals from at least two coverage signals; and outputting said feed signals based on said singlet signals.

13. The method of claim 11, further comprising the steps of:

receiving a first incoming coverage beam from said coverage area arranged in said circular layout;

outputting feed signals corresponding to said first incoming coverage signal;

transforming said feed signals into a first cluster component signals; and combining said first cluster of component signals, based on a predefined weighted mapping scheme, to form a corresponding unique first outgoing coverage signal, such first outgoing coverage signal corresponding to said first incoming coverage beam.

14. The method of claim 11, further comprising the steps of converting a first incoming coverage signal into a first set of singlet signals, each singlet signal of said first set containing at least one component signal from said first incoming coverage signal;

setting an amplitude of at least one of said component signals greater than that of the remaining component signals; and converting said singlet signals to said feed signals.

15. The method of claim 11, further comprising the steps of:

assigning a unique frequency to each coverage signal and associated coverage beam;

dividing each coverage signal into multiple component signals having a predetermined common frequency and predetermined different amplitudes; and setting said predetermined different amplitudes to direct said feed elements arranged in said non-circular layout to cooperate to transmit said coverage beams in said circular layout.

16. The method of claim 11, further comprising the step of outputting sub-signals of said coverage signal phase shifted with respect to one another.

17. The method of claim 11, further comprising the steps of:

dividing said coverage signal into weighted component signals of differing amplitude;

collecting sub-sets of said component signals to produce singlet signals therefrom; and converting said singlet signals to said feed signals.

18. The method of claim 11, further comprising the step of defining feed beams which cooperate to define singlet beams, each singlet beam containing components of multiple coverage beams, said singlet beams being defined in a non-circular layout, wherein singlet beams having components from a single coverage beam are clustered adjacent one another in a singlet cluster, singlet beams within said singlet cluster interacting to define a corresponding coverage beam, said corresponding coverage beam having a center redirected from a center of said singlet cluster.

19. The method of claim 11, further comprising the step of arranging said feed elements in a hexagonal layout, each feed element defining a feed beam, said feed beams cooperating to define singlet beams arranged in a hexagonal layout, said singlet beams cooperating to define said coverage beams in a circular layout.

20. The method of claim 11, wherein said setting step includes setting said amplitudes and phases of said component signals in each cluster unevenly with respect to one another.

* * * * *